(12) United States Patent
Prakash et al.

(10) Patent No.: US 8,798,610 B2
(45) Date of Patent: Aug. 5, 2014

(54) METHOD AND APPARATUS FOR BEARER AND SERVER INDEPENDENT PARENTAL CONTROL ON SMARTPHONE, MANAGED BY THE SMARTPHONE

(75) Inventors: Gyan Prakash, Beaverton, OR (US); Selim Aissi, Beaverton, OR (US); Saurabh Dadu, Tigard, OR (US); Rajesh Poornachandran, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 12/732,541

(22) Filed: Mar. 26, 2010

(65) Prior Publication Data

US 2011/0237221 A1    Sep. 29, 2011

(51) Int. Cl.
*H04M 3/00*    (2006.01)

(52) U.S. Cl.
USPC ........... 455/418; 455/411; 455/466; 455/518; 455/519

(58) Field of Classification Search
CPC ........................ H04W 8/245; H04M 1/72525; H04M 1/72522
USPC ................. 455/418, 411, 466, 518, 519, 521
See application file for complete search history.

(56) References Cited

U.S. PATENT DOCUMENTS

| | | | |
|---|---|---|---|
| 6,732,144 B1* | 5/2004 | Kizu et al. ................ | 709/203 |
| 2004/0179511 A1 | 9/2004 | Kizu et al. | |
| 2005/0096009 A1 | 5/2005 | Ackley | |
| 2006/0030339 A1* | 2/2006 | Zhovnirovsky et al. ... | 455/456.6 |
| 2008/0101578 A1* | 5/2008 | Barros et al. ............. | 379/211.02 |
| 2008/0320577 A1 | 12/2008 | Larduinat | |
| 2011/0044210 A1 | 2/2011 | Yokota | |

FOREIGN PATENT DOCUMENTS

| | | |
|---|---|---|
| CN | 1409535 A | 4/2003 |
| EP | 1798659 A1 | 6/2007 |
| EP | 2178284 A1 | 4/2010 |
| JP | 2005512357 A | 4/2005 |
| JP | 2007-509512 A | 4/2007 |
| JP | 2008-097485 A | 4/2008 |
| JP | 2009044260 A | 2/2009 |
| JP | 2009-520294 A | 5/2009 |

(Continued)

OTHER PUBLICATIONS

Office Action received for Japanese Patent Application No. 2011-034594, mailed Sep. 11, 2012, 2 pages of Japanese Office Action and 2 pages of unofficial English summary translation.

(Continued)

*Primary Examiner* — Nghi H Ly
(74) *Attorney, Agent, or Firm* — Barnes & Thornburg LLP (57) ABSTRACT

In some embodiments, the invention involves parental or master control of a child or subordinate mobile phone without service provider intervention. An embodiment of the invention is a system and method relating to master control of the subordinate smart phone using features on the smart phones, and independent of features provided by the phone service providers. Communication between the master and subordinate phones may be initiated using SMS messaging, near field communication, Bluetooth, direct connect to a PC, or by other secure wireless or wired connections. Once initiated, desired communication events are captured by the parental control application to effect control policies on the subordinate phone. Communication between the phones may be encrypted to prevent malicious intervention of message traffic Other embodiments are described and claimed.

29 Claims, 4 Drawing Sheets

Parent (1-N)

Parental Control Activation Password Protected – via NFC/OTP/Manual

Child (1-N)

(56) References Cited

FOREIGN PATENT DOCUMENTS

| JP | 2009520294 A | 5/2009 |
|---|---|---|
| JP | 2010016844 A | 1/2010 |
| JP | 2010-056584 A | 3/2010 |
| KR | 20010051738 A | 6/2001 |
| WO | 03026138 A2 | 3/2003 |
| WO | 03096722 A1 | 11/2003 |
| WO | 2005031544 A2 | 4/2005 |
| WO | 2007072209 A1 | 6/2007 |
| WO | 2008078798 A1 | 7/2008 |

OTHER PUBLICATIONS

Office Action received for Japanese Patent Application No. 2011-034594, mailed on Feb. 26, 2013, 2 pages of Japanese Office Action and 2 pages of unofficial English translation.

Office Action received for Korean Patent App. No. 10-2011-26728, mailed Dec. 28, 2012, 3 pages of Korean Office Action and 3 pages of unofficial English translation.

Office Action received for Korean Patent App. No. 10-2011-26728, mailed Jul. 30, 2012, 5 pages of Korean Office Action and 4 pages of unofficial English translation.

European Search Report for Application No. 11250200.00-1244, dated Dec. 28, 2012, 3 pages.

European Office Action for Application No. 11250200.00-1244, dated Feb. 2, 2012, 5 pages.

Childroid, The Easiest Way to Stay in Contact, believed to be downloaded on Jul. 12, 2011 from www.justbit.it/childroid, 4 pages.

Office Action received for Chinese Patent Application No. 201110084606.4, mailed Aug. 13, 2013, 46 pages of Office Action including 32 pages of unofficial English translation.

\* cited by examiner

Fig. 5

METHOD AND APPARATUS FOR BEARER AND SERVER INDEPENDENT PARENTAL CONTROL ON SMARTPHONE, MANAGED BY THE SMARTPHONE

FIELD OF THE INVENTION

An embodiment of the present invention relates generally to smart mobile telephones ("smart phones") and, more specifically, to parental (master) control of a child's (subordinate's) smart phone, where the control is managed by the smart phone and not a service provider.

BACKGROUND INFORMATION

With fast growing smart phone usage among children and teenagers there is a strong need for secure parental control mechanism. Various mechanisms exist for parental control based on a service provider's model. A number of parental control mechanism based on service provider business model are available but none of them allow a user to setup and manage parental control from one phone to another phone without service provider's or server's support.

The current parental control mechanisms are not available as an independent phone feature, but only as a parental control service model. Parenting control policies are either configured on child phone directly or at a server owned by the service provider, which pushes the policy down to child phone. Thus, a parent, or master, is constrained to features and availability provided by the service provider.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to master control of a subordinate or child smart phone using features on the smart phones, and independent of features provided by the phone service providers. For purposes of illustration the term "parent" is used to refer to the user of the master phone and "child" is used to refer to the user of the subordinate phone. It will be understood that familial relationship is not required, but that the master phone may control and monitor the subordinate phone usage as is typically desired by a parent with a minor child. This control will be herein referred to as "parental control." Embodiments of the present invention enable a feature for the parent to control a child's phone securely without support from cellular service providers.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In an embodiment of the invention, the parental control may be enabled on the child's phone by parent or guardian by performing the following:

Activate the "Parenting Control Child" feature on child's phone with a manually entered password or by provisioning One Time Password (OTP) algorithms between the phones. Other mechanisms that may also be used for establishing trust between phones;

Provide the phone number that will be used to manage/monitor parental control child's phone; and Activate the "Parenting Control Master" on parent's phone with the phone number that is to be monitored and controlled (child's phone number).

In an embodiment, the parenting control can only be disabled by providing a correct password or OTP and then disabling the control feature. In embodiments of the invention, the management and control is a many-to-many relationship. In other words, multiple child phones may be controlled by a master phone, and multiple master phones may control the same child phone. The terminology "child(1–N)" indicates any or all of one to a number N child phones are affected.

Once the parenting control mechanism has been activated on child's phone, the parent/guardian may setup the following from the parent's own phone:

SMS Policy, language parsing control and SMS redirections;

Phone calling control;

Phone receiving control and redirection;

Restricted location based beaconing when near to restricted location by n meters;

IM and Web browsing policy and language control; and

Phone application download and install policy.

It will be understood that other embodiments may implement additional or fewer features as those described here, and embodiments of the invention are not limited to these features.

Figure 1:
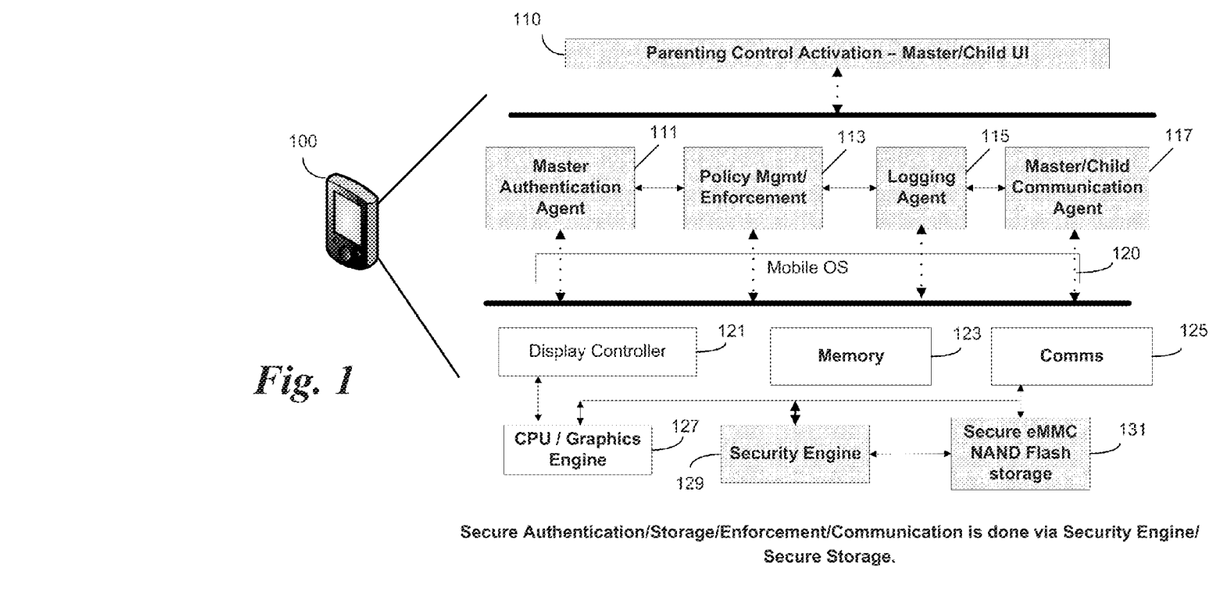
FIG. 1 is a block diagram illustrating components of a system for parental control, according to an embodiment of the invention.

FIG. 1 is a block diagram illustrating components of a system for parental control, according to an embodiment of the invention. A mobile phone 100 has a mobile operating system 120 for usual phone control. The mobile phone 100 also has a parental control activation engine and user interface 110 to provide synchronization, authorization and control activities to the child phone. The parental control activation engine 110 provides for parenting control master (PCM) activation or parenting control child (PCC) activation. The user may activate either one of these activation features, and then protect the activation by password. The password may be either set manually, or NFC (Near Field Communication) may be used to perform one time password (OTP) based password protection. With OTP, the user will not have to remember the password. In an embodiment, more than one master may be used, for instance, when there are two (or more) parents. In this case, the child phone must be associated with multiple masters. Hence, the same OTP algorithm will be available on both masters. This may also be useful when there is sync between multiple masters.

The activation engine/User interface (UI) 110 may comprise a master authentication agent 111, policy management and enforcement agent 113, logging agent 115, and master/child communication agent 117, to be discussed in more detail below. These components 111, 113, 115 & 117 may be part of the parenting control activation engine and user interface 110 or any of them may be implemented as a separate, but integrated module. These agents may communicate with the OS 120, with the UI (if implemented as separate modules, or among themselves (as depicted in FIG. 1). The OS may be coupled to a display controller 121, memory 123, and wireless communication 125. Communication 125 may interact with a graphics engine 127, a security engine controller 129 and secure flash memory storage 131. The security engine 129 may be an embedded microcontroller to encrypt and decrypt messages efficiently.

The parenting control policy management and enforcement agent 113 may utilize parental control policies, usually referred to herein merely as "policy," which are encrypted and stored in the master and child phone. The policy may not be edited or modified on the child phone, except when requested by the master. The policy may be edited and modified only on the master phone. When the policy is changed on the master phone, the master phone may initiate an SMS-based data sync between the master and child phone. The master phone may also sync between another master phone if there is more than one master phone to be used to manage a child phone. In this way both (all) masters reflect the same policy for the same child.

In an embodiment, some features that may be defined by the policy are:

Short message service (SMS) policy, language parsing control, and SMS redirections;
Multimedia messaging service (MMS) policy;
Phone calling policy;
Phone receiving control and redirection;
Restricted location-based beaconing when near to a restricted location;
Instant messaging (IM) and Web browsing policy and language control; and
Phone application download and install policy.

Based on policy, the child phone may scan each phone call, SMS, MMS, web browsing initiated and received. The initiated phone call, SMS, MMS, or web browsing may be blocked; and a received phone call, SMS, MMS, or IM may be redirected to the master phone. The policy may be a full monitoring of these activities, or be set to only manage some of the activities.

Based on the policy, the child phone may also send location beaconing to the master phone if the child phone is out of the specific network area, or based on its GPS location.

The parenting control master authentication agent 111 is responsible for authenticating a master phone request on the child phone, for instance, whenever the policy is changed, or a request for location or log is sent/received. The child phone authenticates the master phone's request and sends the appropriate response message back to master phone. This agent 111 intercepts SMS messages to begin a session or data connection and authenticates the master using certificates, keys and/or passwords. Which secure communication method is to be used is an implementation choice by the application developer. Several methods may be implemented, allowing the user to select one for use. Once authenticated, the master and child phone may communicate via TCP/IP protocols.

The master-child communication agent 117 controls communications between the master and child phones. The communication agent 117 may perform handshake tasks to establish a data connection between phones, i.e., secure messages and message acknowledgements, including IP addresses may be sent back and forth for authentication and session establishment. This agent 117 maintains a parenting control communication stack. The parenting control communication stack holds requests from the master. The agent processes the requests on the stack for the master phone. For instance, if a request for logging and location is requested by the master, then the child phone will follow the request and send the appropriate information. For a location request, the child phone may need to turn on GPS to gather location information before completing the request. No user interventions are required to complete the requests.

The parenting control logging agent 115 provides information regarding past event activity. The parenting control agent logs the activity based on the policy settings and logging policy settings.

Figure 2:
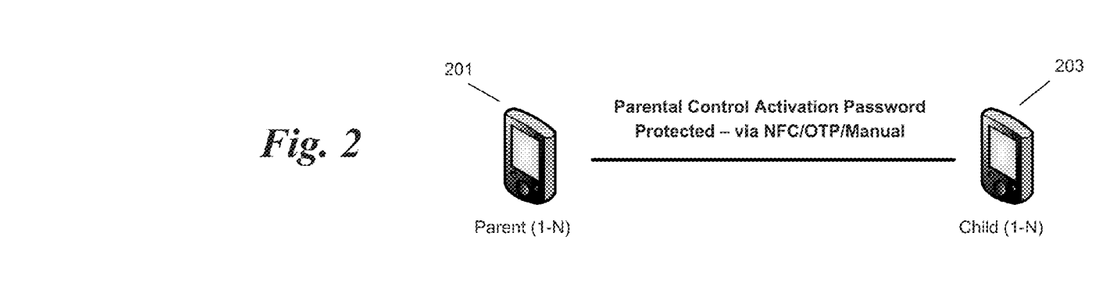
FIG. 2 is a block diagram illustrating that a parent phone may communicate directly with a child phone with a password activation scheme, according to embodiments of the invention.

FIG. 2 is a block diagram illustrating that the parent phone 201 may communicate directly with the child phone 203 with a password activation scheme. A many-to-many relationship may exist among master and child phones.

Figure 3:
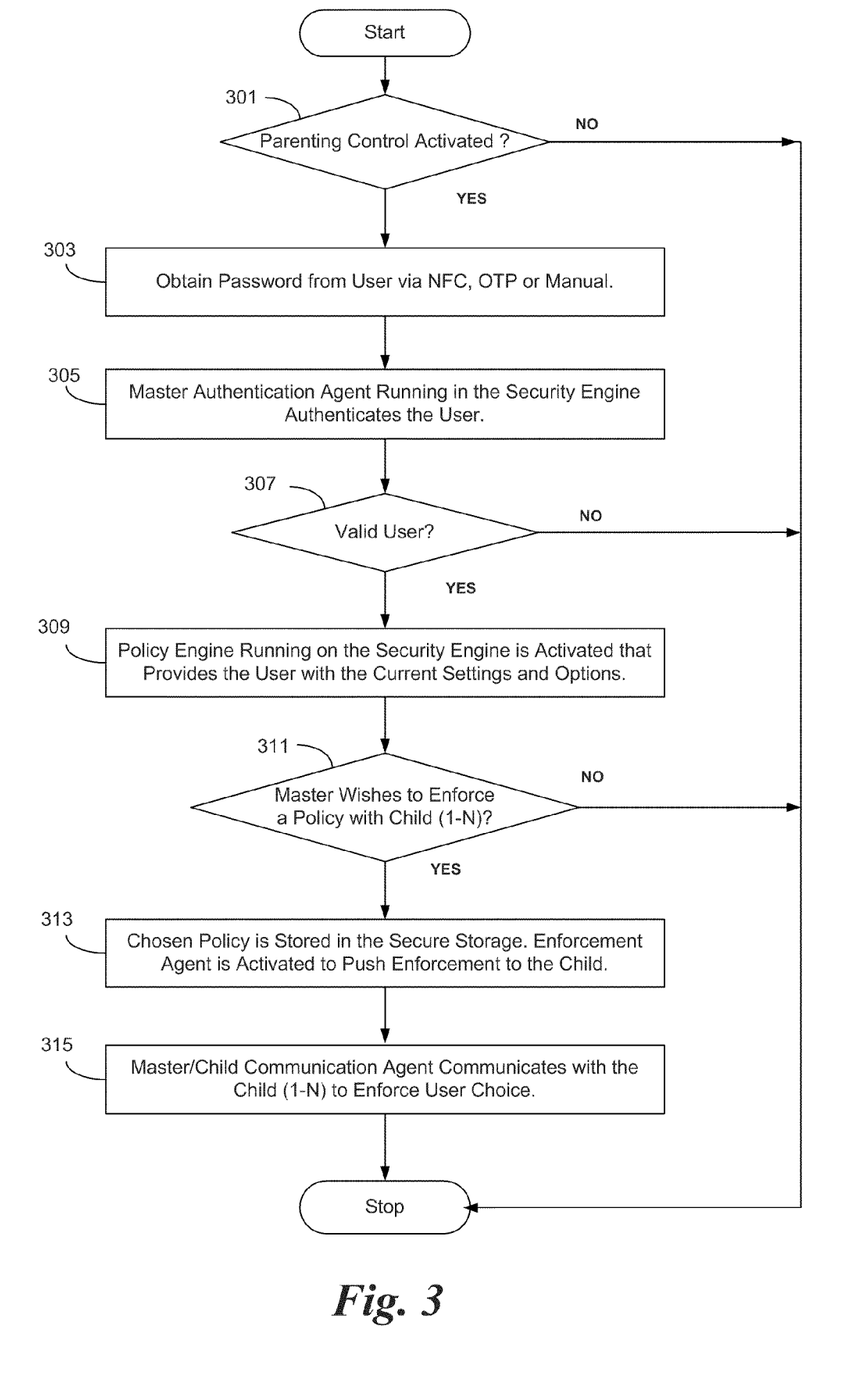
FIG. 3 is a flow diagram illustrating a method of a parenting control activation engine, according to an embodiment of the invention.

FIG. 3 is a flow diagram illustrating a method of a parenting control activation engine (110), according to an embodiment of the invention. If parenting control is activated, as determined in block 301, a password is obtained from the user via near field communication (NFC), one time password (OTP) or manually entered by the parent (master), in block 303. Since the engine is running within a phone application, a user interface provides the user the opportunity to select this feature from the phone, with no intervention by a service provider. A master authentication agent (111) on the phone may execute with a security engine (129) to authenticate the user, in block 305. The security engine (129) may be an embedded microcontroller configured to encrypt, decrypt and authenticate certificates or keys. If the user is valid, as determined in block 307, a policy engine (113) is activated on the phone that may execute with the security engine (129), in block 309. The stored policies may provide the master user with current settings and a list of options. Available options may vary by device or initial purchase level. Some possible options have been discussed above, for instance limiting SMS, MMS, phone calls, etc.

A determination is made as to whether the user has chosen to enforce a policy for a child in block 311. Embodiments of the invention allow parental control of one to N children, i.e., "child (1–N)." The new or updated policy selected may then be stored in secure storage (131) on the master phone, in block 313. This policy enforcement agent (113) is then activated for communication to the child phone with the master/child communication agent (117). This policy agent (113) sends the enforcement request to the child phone (1–N) via the communication agent (117), in block 315. Communications between the master and child phone may be performed in a variety of ways, some depending on proximity. If a channel has already been established, then that channel may be used to send the enforcement request to the child. If no channel has been established, or the previous channel has been lost, a new channel will be established, using the authentication methods described herein.

If the phones are very close, NFC communications may be used. At a more increased distance, Bluetooth communications may be used. When the child phone is at a more distant location, SMS messages may be used to send and receive authentication messages between the phones. For close proximity, messages may be sent without being sent over a provider's data or voice network. Even when SMS messages are used for communication, there is no capture or intervention of the messages by the service provider; the SMS messages are sent through the mobile network as any other SMS message, albeit transparent to the user. Once the data connection is established, TCP/IP communication may be used for further communication and requests.

Figure 4:
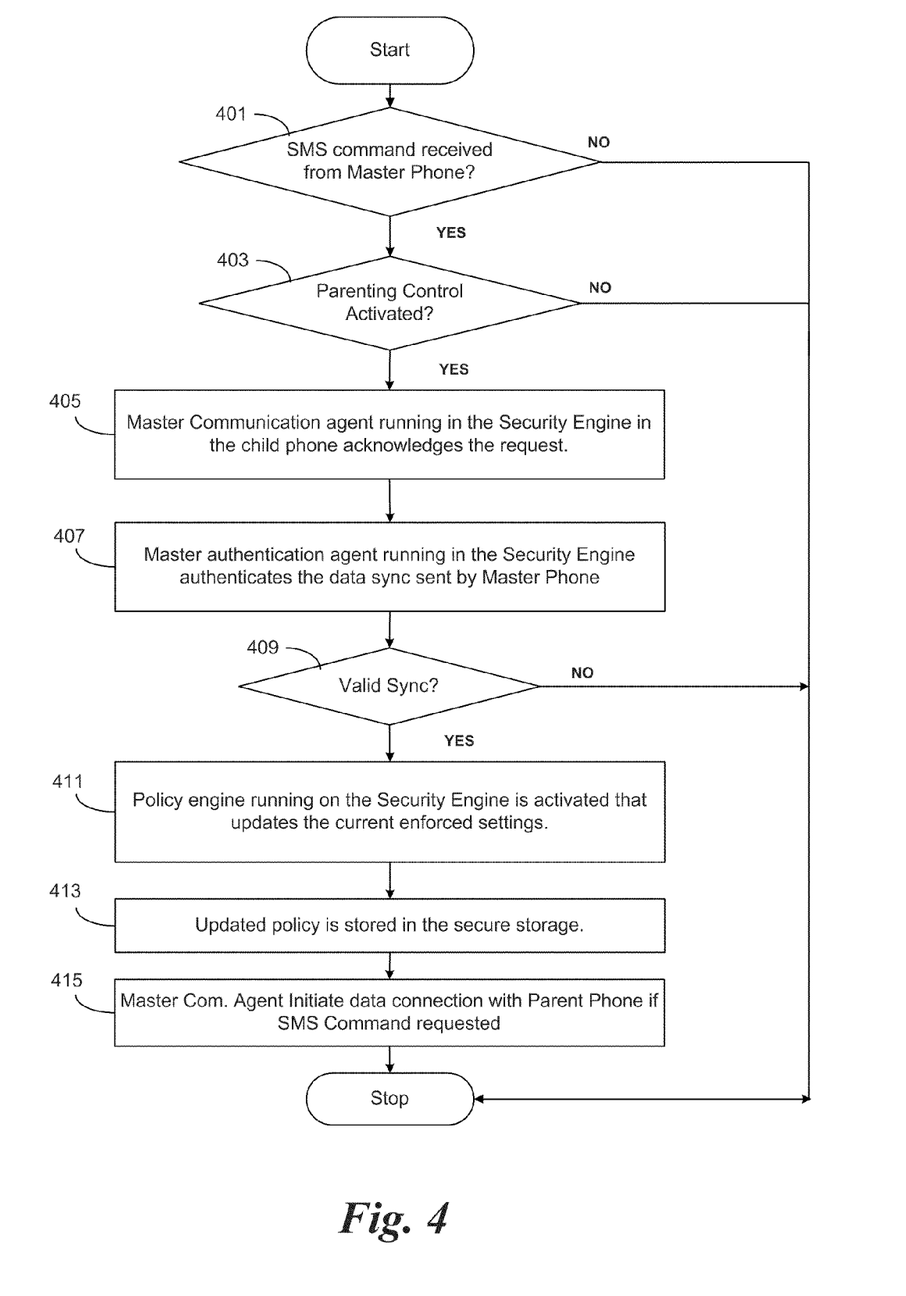
FIG. 4 is a flow diagram illustrating a method for a control activation engine on a child phone, according to an embodiment of the invention.

FIG. 4 is a flow diagram illustrating a method for a control activation engine on a child phone, according to an embodiment of the invention. A determination of whether an SMS command from a master phone has been received, in block 401. Incoming SMS messages may be captured within the phone by a driver/agent prior to usual message display. If the message is encoded as a parental control type message, it is not displayed on the child phone, but effects the child communication agent (117) to act, based on the message content.

If parenting control is activated on the phone, as determined in block 403, then the communication agent (117) communicates with the security engine (129) for verification and sends an acknowledgment of the control request back to the master, in block 405. In an embodiment, the acknowledgement maybe delayed until both the master and enforcement messages are both authenticated, to avoid sending an acknowledgement to a unauthorized/unauthenticated user. The authentication agent (111) then authenticates the data sync, or command/request, sent by the master phone, in block 407. If the sync is valid, as determined in block 409, the policy engine (113) on the child is activated to update the current settings with settings received by the master, in block 411. The updated policy is then stored in a secure area (131) which is not modifiable directly by the child user, in block 413.

In some cases, for instance, if the child phone was off or out of range when the master sends a request, the child phone will receive a delayed request. If the master had requested a data connection, the child may initiate a delayed data connection request to the master, or to reinstate a lost connection. If an SMS command requests a data connection, the communication agent (117) may initiate the data connection with the master phone, in block 415.

A security protocol may be set up between the master phone and child phone using symmetric encryption algorithms or asymmetric algorithms such as PKI technology. As discussed above, the communication may be using NFC, Bluetooth or SMS. The parental control applications on the phones determine which method is to be used at any given time. In an embodiment, the connection method may be user selectable. For instance, when a connection is requested via SMS, the master phone may send an SMS message with the master's IP address and a request for the child to return an SMS with an IP address. The messages may be encrypted and signed with PKI or symmetric key algorithms. The data connection is initiated so that further communications are sent securely between the two phones, typically using TCP/IP protocols.

The master phone may send a message, for instance, requesting the child phone to turn on GPS and return a location. Another request may be for the master phone to request that all SMS messages received by the child phone are to be redirected to the master phone. This redirection may prevent the messages from being received by the child, i.e., not displayed, or may be redirected while also allowing the child to view the messages. The master phone may send a request to control a specific device on the child phone, for instance, turning on the camera.

In an embodiment, the master and child phone are initially set up by a parent. The parent may connect both phones to a personal computer (PC), for instance by USB connections to commence the initial set-up. An application on the PC allows the parent to set up an initial policy, and security keys and password, In another embodiment, the phones may be set up using near field communication (NFC) protocols. Bluetooth may be used, but is widely believed to be less secure, therefore not optimal. Other protocols may be used in other embodiments. Once the protocol has been established, a user interface is used on either the PC or phones to initiate the key, password and initial policy. The master may then change the policies on the child phone or control phone devices such as GPS or camera through the data network. As discussed above, a secure SMS message is sent via the data network from the master phone to the child phone to initiate the policy change and device control of the child phone.

Once connected, TCP/IP protocols may be used to maintain a data connection between the master and child phones. A periodic "keep alive" message may be sent back and forth to keep the data connection alive. The data connection is transparent to the user of the child phone, and may be kept alive until the master phone requests a disconnect, of the child phone is powered off or leaves the service area.

Existing mobile phones have the capability to send secure SMS messages. However, this feature is not available to users of the phones. In an embodiment, an additional layer between the parental control application user interface and the lower level phone services may be added to utilize the existing security modules of the phone, as well as SMS and other messaging.

Figure 5:
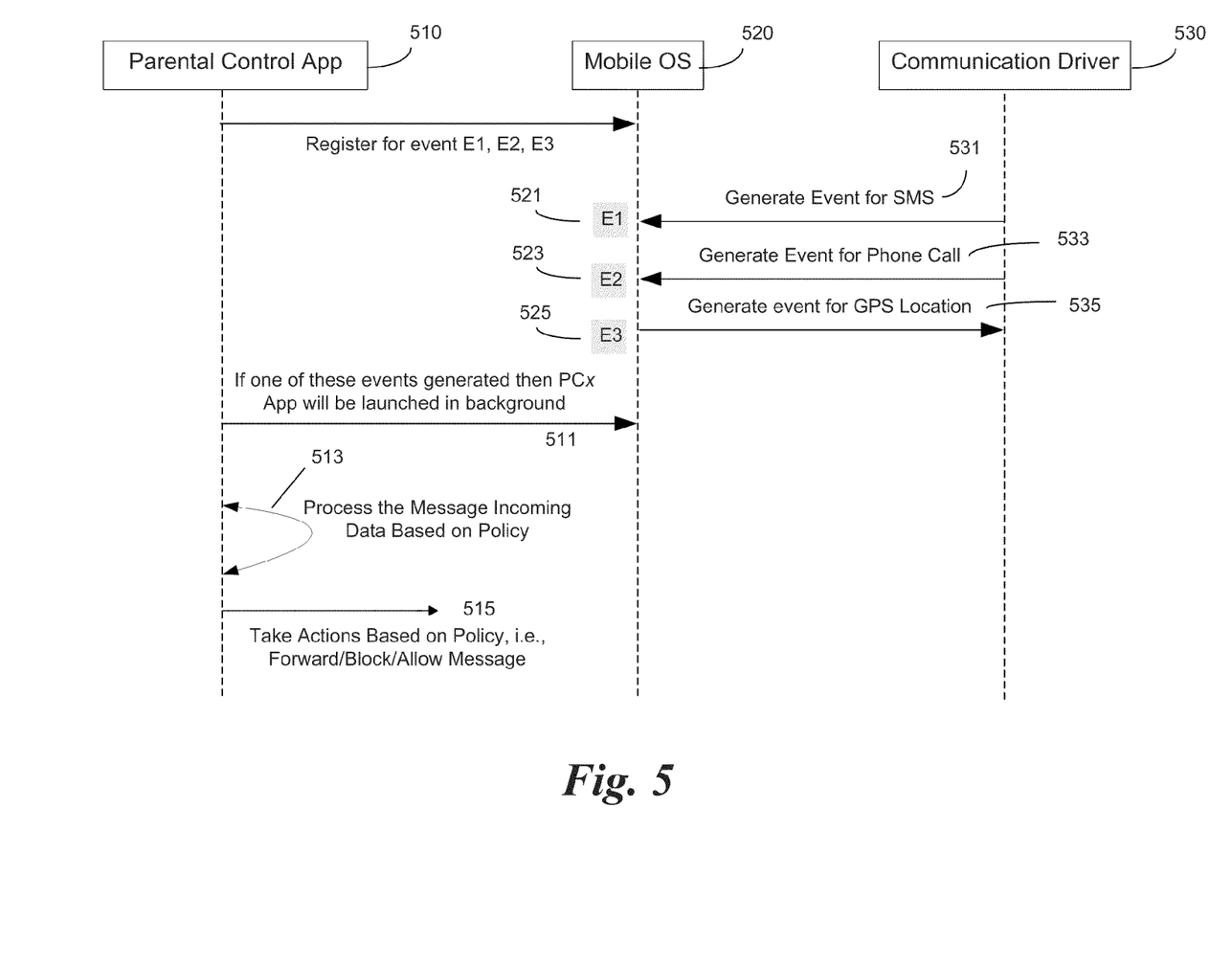
FIG. 5 is a combination block and flow diagram to illustrate event traffic between the parental control application, mobile OS and communication driver, according to an embodiment of the invention.

When an SMS message is received by a phone, an event is generated. This event may be used to initiate the parental control requests on the child phone. FIG. 5 is a combination block and flow diagram to illustrate event traffic between the parental control application, mobile OS and communication driver, according to an embodiment of the invention. Once the SMS messages initiate a secure data connection between the phones, the master and child phones may interact like any two devices on a network, as their IP addresses are now known to one another.

In an embodiment, the parental control application 510 registers with the mobile operating system (OS) 520 for events of type E1 (521), E2 (523) and E3 (525). When a message or phone call, or other communication is received on the phone, it will be captured at the lowest level by the communication driver 530. The communication driver 530 is a typically service below the OS. When the communication is received by the communication driver 530, an event is generated based on the type of communication. For instance, an incoming SMS message may generate (531) an event of type E1 (521). An incoming phone call may generate (533) an event of type E2 (523). Outgoing communications are sent via the communication driver 530, and also provide events for the OS. For instance, sending the GPS location of the phone may generate (535) and event of type E3 (525).

When an event of a type that has been registered by the parenting control application is generated, the parenting control application 510 is launched (511) in the background, transparent to the user. The message or data associated with the event may be processed (513) based on the policy stored on the phone. An action may then be taken (515) based on the message, associated information and policy. For instance, on a child phone, message or call forwarding may be initiated or canceled, or the camera or GPS may be turned on, etc. On a master phone, the message may indicate that the child phone has received a phone call, text message or moved into a restricted area, etc. The policy will dictate whether this event is merely logged, displayed, or the parent alerted, etc.

It will be understood that the parenting control application must be of a higher privilege level than usual user applications in order to be able to access the messages/events before other user applications. The logging agent may log commands, events, and actions taken, i.e., communications between the master and child phone.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible/readable medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, for instance in the flow diagrams discussed above, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
a plurality of mobile phones, each phone to be identified as one of either a master phone or a child phone, each master phone configured to control at least one child phone, wherein each child phone to be configured to be controlled by at least one master phone, wherein each phone further comprising:
a user interface of a parental control application to allow a master user on a master phone to interactively manage and control the at least one child phone, wherein a set-up phase is to identify whether a phone is to act as a master phone or child phone;
an authentication agent configured to enable the phone to authenticate a data connection session between a master phone and child phone, and between more than one master phone, the authentication to utilize a security engine coupled to the phone for encrypting and decrypting messages and/or certificates;
a policy management and enforcement agent to initiate changes in a control policy in a child phone and record the changes in the master phone, wherein (i) the control policy defines control and management of at least one feature of the child phone and (ii) the policy management and enforcement agent restricts, redirects, and/or monitors the at least one feature of the child phone, according to the control policy;

a communication agent configured to send requests and control policy changes from the master phone to the child phone, and perform a handshake communication between phones to initiate the data connection session is by a series of short message service (SMS) messages between a master phone and child phone, wherein the master hone and child shone communicate via a TCP/IP protocol after the data connection session is initiated by the series of SMS messages; and secure storage for storing at least one control policy, the at least one control policy being associated with one of the at least one child phones.

2. The system as recited in claim 1, further comprising a logging agent to log message and event activity in a phone.

3. The system as recited in claim 1, further comprising a communication driver to generate an event associated with a message type and content of a received SMS message, wherein the generation of an event type registered by the parental control application is to be processed by the parental control application before other user applications on the phone.

4. The system as recited in claim 1, wherein the policy identifies control and management in the child phone of at least one of: short message service (SMS) policy; language parsing control and SMS redirections; phone calling control; phone receiving control and redirection; restricted location based beaconing when near to restricted locations; instance messaging (IM) and Web browsing policy and language control; and phone application download and install policy.

5. A child mobile phone, comprising:
a plurality of communication features of the child phone to be controlled by at least one authenticated master phone, wherein control of the communication features is transparent to a user of the child phone;
an authentication agent configured to enable the child phone to authenticate a data connection session between a master phone and the child phone, the authentication to utilize a security engine coupled to the child phone for encrypting and decrypting messages and/or certificates;
a policy management and enforcement agent to initiate changes in a control policy in the child phone and record the changes in a secure storage coupled to the child phone, wherein (i) the control policy defines control and management of at least one feature of the child phone and (ii) the policy management and enforcement agent restricts, redirects, and/or monitors the at least one feature of the child phone, according to the control policy;
a communication agent configured to receive requests and control policy changes from the master phone, and perform a handshake communication between the child phone and the master phone to initiate the data connection session by a series of short message service (SMS) messages between the master phone and the child phone, wherein the master phone and the child phone communicate via a TCP/IP protocol after the data connection session is initiated by the series of SMS messages.

6. The phone as recited in claim 5, further comprising a communication driver to generate an event associated with a message type and content of a received SMS message, wherein the generation of an event type registered by a parental control application on the child phone is to be processed by the parental control application before other user applications on the phone.

7. The phone as recited in claim 5, wherein the policy identifies control and management in the child phone of at least one of: short message service (SMS) policy; language parsing control and SMS redirections; phone calling control; phone receiving control and redirection; restricted location based beaconing when near to restricted locations; instance messaging (IM) and Web browsing policy and language control; and phone application download and install policy.

8. A master mobile phone, comprising:
a user interface of a parental control application to allow a master user on the master phone to interactively manage and control at least one child phone, wherein a set-up phase is to identify whether a phone is to act as a master phone or child phone;
an authentication agent configured to enable the master phone to authenticate a data connection session between the master phone and the at least one child phone, the authentication to utilize a security engine coupled to the master phone for encrypting and decrypting messages and/or certificates;
a policy management and enforcement agent to initiate changes in a control policy in the at least one child phone and record the changes in a secure storage coupled to the master phone, wherein (i) the control policy defines control and management of at least one feature of the child phone and (ii) the child phone restricts, redirects, and/or monitors the at least one feature of the child phone, according to the control policy;
a communication agent configured to send requests and control policy changes to the at least one child phone, and perform a handshake communication between the at least one child phone and the master phone to initiate the data connection session by a series of short message service (SMS) messages between the master phone and the at least one child phone, wherein the master phone and the child phone communicate via a TCP/IP protocol after the data connection session is initiated by the series of SMS messages.

9. The phone as recited in claim 8, further comprising a communication driver to generate an event associated with a message type and content of a received SMS message, wherein the generation of an event type registered by the parental control application on the master phone is to be processed by the parental control application before other user applications on the phone.

10. The phone as recited in claim 8, wherein the policy identifies control and management in the at least one child phone of at least one of: short message service (SMS) policy; language parsing control and SMS redirections; phone calling control; phone receiving control and redirection; restricted location based beaconing when near to restricted locations; instance messaging (IM) and Web browsing policy and language control; and phone application download and install policy.

11. The phone as recited in claim 8, wherein a master synchronization data connection session is to be initiated between the master phone and at least one other master phone, the at least one other master phone configured to control a same child phone as to be controlled by the master phone, wherein the master synchronization data connection is to synchronize a stored policy on the master phone and the at least one other master phone, the stored policy with the same child phone.

12. A method for controlling at least one child mobile phone by at least on master mobile phone, comprising:
identifying whether a phone is to be a master or child phone, by a master user;
initiating a message handshake protocol between a master phone and a child phone;

initiating a data connection session between the master phone and the child phone by a series of short message service (SMS) messages between the master phone and the child phone;
communicating between the master phone and the child phone via a TCP/IP protocol after the data connection session is initiated by the series of SMS messages;
requesting authentication of the master phone to the child phone;
controlling features of the child phone by the master phone, after authentication by sending a control policy to the child phone;
defining control and management of at least one feature of the child phone in the control policy; and
restricting, redirecting, and/or monitoring the at least one feature of the child phone, according to the control policy.

13. The method as recited in claim 12, wherein, the sending of the control policy to the child phone further comprises:
sending a request to the child phone from the master phone;
when the request comprises a change in control policy, storing the change in control policy in a secure storage coupled to the master phone.

14. The method as recited in claim 13, further comprising:
receiving a request by the child phone; and
performing an action based on the request.

15. The method as recited in claim 14, wherein when the request received by the child phone comprises a control policy change, then storing the control policy change in a secure storage coupled to the child phone.

16. The method as recited in claim 14, further comprising:
registering, with a mobile operating system on the child phone, events to be captured and processed by a parental control module, wherein the events to be captured are associated with the features to be controlled by the master phone, and processing by the parental control module is prior to processing of the events by user applications on the child phone.

17. A method for enabling control in a child phone by at least one master phone, comprising:
identifying whether a phone is to be a master or child phone, by a master user;
defining control and management of at least one feature of the child phone in a control policy;
responding to a message handshake protocol initiation between a master phone and a child phone;
initiating a data connection session between the master phone and the child phone by a series of short message service (SMS) messages between the master phone and the child phone;
communicating between the master phone and the child phone via a TCP/IP protocol after the data connection session is initiated by the series of SMS messages;
receiving a request for authentication of the master phone by the child phone;
authenticating the master phone by the child phone;
receiving a request from the master phone, by the child phone, wherein the request received by the child phone comprises a control policy change; and
restricting, redirecting, and/or monitoring the at least one feature of the child phone, according to the control policy as updated by the control policy change.

18. The method as recited in claim 17, further comprising:
performing an action based on the request, responsive to receiving the request by the child phone.

19. The method as recited in claim 18, further comprising storing the control policy change in a secure storage coupled to the child phone, the secure storage inaccessible to a non-master user on the child phone.

20. The method as recited in claim 18, further comprising:
registering, with a mobile operating system on the child phone, events to be captured and processed by a parental control module, wherein the events to be captured are associated with the features to be controlled by the master phone, and processing by the parental control module is prior to processing of the events by user applications on the child phone.

21. A non-transitory, machine readable storage medium having instructions stored thereon for controlling at least one child mobile phone, the instructions when executed by a machine cause the machine to:
categorize that a phone is to be a master phone or a child phone based on a selection by a master user;
initiate a message handshake protocol between a master phone and a child phone;
initiate a data connection session between the master phone and the child phone by a series of short message service (SMS) messages between the master phone and the child phone;
communicate between the master phone and the child phone via a TCP/IP protocol after the data connection session is initiated by the series of SMS messages;
request authenticating of the master phone to the child phone;
control features of the child phone by the master phone, after authentication by sending a control policy to the child phone;
define control and management of at least one feature of the child phone in the control policy; and
restrict, redirect, and/or monitor the at least one feature of the child phone, according to the control policy.

22. The medium as recited in claim 21, wherein, the sending of the control policy to the child phone further comprises instructions to:
send a request to the child phone from the master phone;
when the request comprises a change in control policy, store the change in control policy in a secure storage coupled to the master phone.

23. The medium as recited in claim 22, further comprising instructions to:
receive a request by the child phone; and
perform an action based on the request.

24. The medium as recited in claim 23, wherein when the request received by the child phone comprises a control policy change, then store the control policy change in a secure storage coupled to the child phone.

25. The medium as recited in claim 23, further comprising instructions to:
register, with a mobile operating system on the child phone, events to be captured and processed by a parental control module, wherein the events to be captured are associated with the features to be controlled by the master phone, and processing by the parental control module is prior to processing of the events by user applications on the child phone.

26. A non-transitory, machine readable storage medium having instructions stored thereon for enabling controlling of a child mobile phone, the instructions when executed by a machine cause the machine to:
categorize that a phone is to be a master phone or a child phone based on a selection by a master user;
define control and management of at least one feature of the child phone in a control policy;

respond to a message handshake protocol initiation between a master phone and a child phone;

initiate a data connection session between the master phone and the child phone by a series of short message service (SMS) messages between the master phone and the child phone;

communicate between the master phone and the child phone via a TCP/IP protocol after the data connection session is initiated by the series of SMS messages;

receive a request for authentication of the master phone by the child phone;

authenticate the master phone by the child phone;

receive a request from the master phone, by the child phone, wherein the request received by the child phone comprises a control policy change; and restrict, redirect, and/or monitor the at least one feature of the child phone, according to the control policy as updated by the control policy change.

27. The medium as recited in claim 26, further comprising instructions to:

perform an action based on the request, responsive to receiving the request by the child phone.

28. The medium as recited in claim 27, further comprising instructions to: store the control policy change in a secure storage coupled to the child phone, the secure storage inaccessible to a non-master user on the child phone.

29. The medium as recited in claim 27, further comprising instructions to:

register, with a mobile operating system on the child phone, events to be captured and processed by a parental control module, wherein the events to be captured are associated with the features to be controlled by the master phone, and processing by the parental control module is prior to processing of the events by user applications on the child phone.

* * * * *